US008755290B2

(12) United States Patent
Li et al.

(10) Patent No.: US 8,755,290 B2
(45) Date of Patent: Jun. 17, 2014

(54) METHOD AND APPARATUS FOR PROVIDING A WIRELESS SERVICE RECOMMENDATION

(75) Inventors: Zhi Li, San Ramon, CA (US); Raghvendra Savoor, Walnut Creek, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 562 days.

(21) Appl. No.: 12/341,916

(22) Filed: Dec. 22, 2008

(65) Prior Publication Data

US 2010/0157823 A1    Jun. 24, 2010

(51) Int. Cl.
*H04W 24/00* (2009.01)
*H04L 12/26* (2006.01)

(52) U.S. Cl.
CPC ............. *H04W 24/00* (2013.01); *H04L 43/08* (2013.01)
USPC .......................................... 370/252; 370/338

(58) Field of Classification Search
USPC ......... 370/252–253, 254–258, 328–334, 338; 455/434–442; 709/223, 224
See application file for complete search history.

(56) References Cited

U.S. PATENT DOCUMENTS

| | | | |
|---|---|---|---|
| 2004/0190448 A1* | 9/2004 | Fishteyn et al. | 370/229 |
| 2006/0068815 A1* | 3/2006 | Caspi et al. | 455/466 |
| 2006/0187873 A1* | 8/2006 | Friday et al. | 370/328 |
| 2008/0130597 A1* | 6/2008 | Kalhan | 370/338 |
| 2009/0042557 A1* | 2/2009 | Vardi et al. | 455/422.1 |
| 2009/0154426 A1* | 6/2009 | Perraud et al. | 370/332 |
| 2010/0062746 A1* | 3/2010 | Proctor et al. | 455/411 |
| 2010/0083121 A1* | 4/2010 | Famolari et al. | 715/736 |
| 2010/0097956 A1* | 4/2010 | Tauil et al. | 370/254 |

* cited by examiner

*Primary Examiner* — Pao Sinkantarakorn

(57) ABSTRACT

A method and apparatus for providing a wireless service recommendation are disclosed. For example, the method collects wireless access performance data, and analyzes the wireless access performance data for generating a ranking of a plurality of wireless access services that are available for a physical location. The method then provides the ranking of the plurality of wireless access services that are available for the physical location via an on-line social network website that is accessible to a mobile device that is proximate to the physical location.

19 Claims, 4 Drawing Sheets

300

METHOD AND APPARATUS FOR PROVIDING A WIRELESS SERVICE RECOMMENDATION

The present invention relates generally to wireless communication network and, more particularly, to a method and apparatus for providing a wireless service recommendation, e.g., using social networks.

BACKGROUND OF THE INVENTION

Consumers have choices in wireless access, including wireless fidelity (WiFi) services, cellular network services, and the like, but the performance and availability of wireless network services may vary by location or by service providers. There is no heterogeneous wireless coverage tracking service that automatically updates the availability of wireless access points or wireless signal strength on a service-provider agnostic basis. When a user moves into a new service area, the user often cannot make an informed choice to select the best wireless access service that is available.

SUMMARY OF THE INVENTION

In one embodiment, the present invention discloses a method and apparatus for providing a wireless service recommendation. For example, the method collects wireless access performance data, and analyzes the wireless access performance data for generating a ranking of a plurality of wireless access services that are available for a physical location. The method then provides the ranking of the plurality of wireless access services that are available for the physical location via an on-line social network website that is accessible to a mobile device that is proximate to the physical location.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, although consumers have choices in wireless access, the performance and availability of different wireless network services often vary by location. When a user moves into a new service area, the user often cannot make an informed choice to select the best wireless access service that is available.

On the other hand, social networks have been used by users to exchange information and experience, mostly limited to video, audio, and data content sharing. Here, a social network is broadly defined as an on-line network (e.g., implemented as a website) that is used by a group of users to exchange information and experience. However, social networks have never been used to track and publish wireless access performance information. Thus, in one embodiment, the present invention enables the use of social networks to support autonomous wireless access performance logging.

Figure 1:
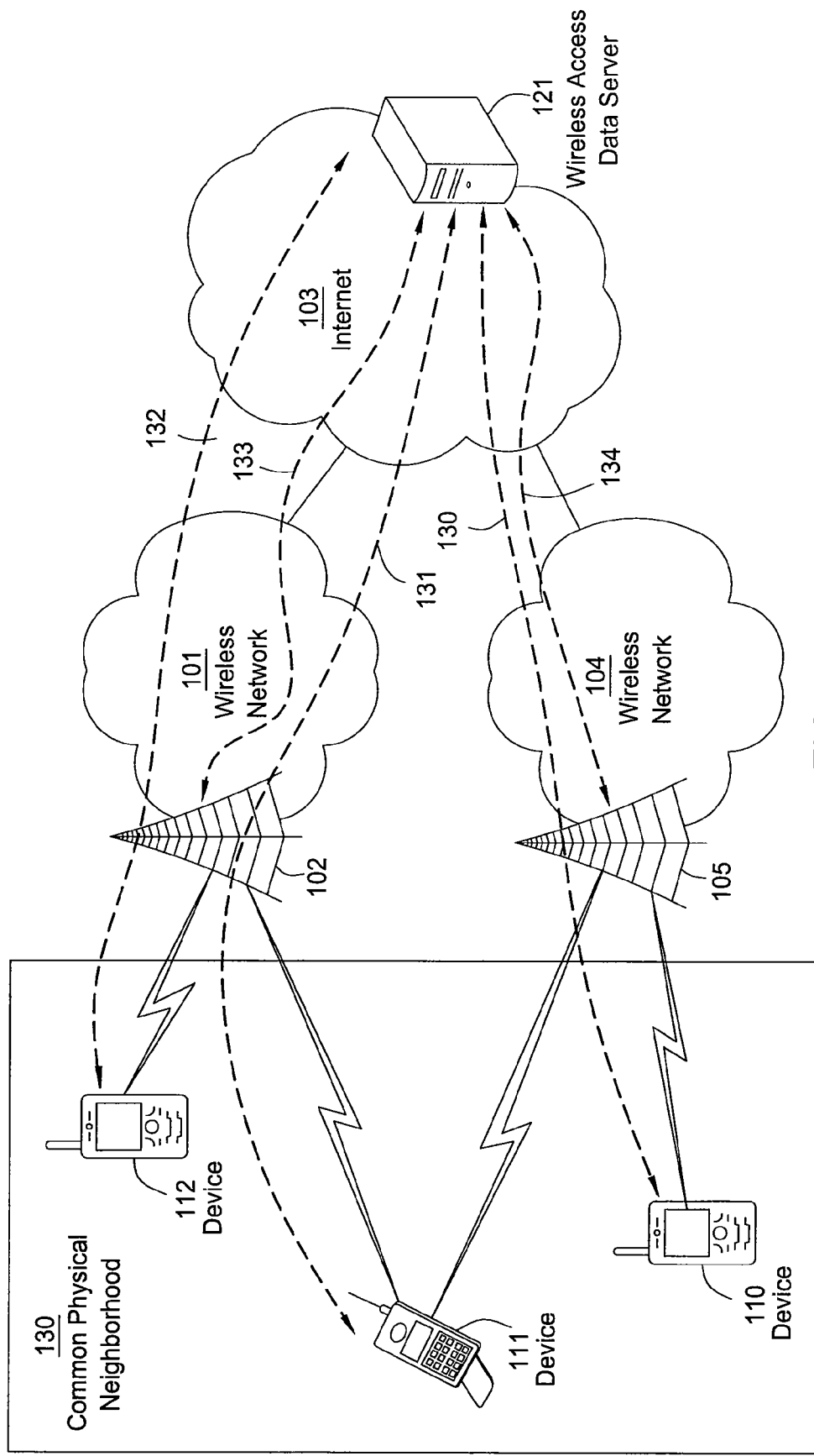
FIG. 1 illustrates an illustrative architecture for providing autonomous wireless access availability and performance logging using social networks related to the present invention.

FIG. 1 illustrates an exemplary architecture 100 for providing autonomous wireless access performance logging using one or more social networks related to the present invention. In FIG. 1, wireless devices 110, 111, and 112 (e.g., including but not limited to mobile phones, personal digital assistants (PDAs), notebook computers, handheld computers, and the like) are devices that travel into a common physical neighborhood 130 served by an access point (AP) 102 of the wireless network 101 and an AP 105 of the wireless network 104. In this illustrative example, the wireless network 101 and the wireless network 104 are different wireless networks, e.g., different types of wireless network, or the same type of wireless network, but operated by different service providers. Note that an AP includes network elements with the capability to support various type of wireless services, e.g., WiFi, WiMAX, 2G, 3G, or LTE or other 4G wireless services, and the like.

Broadly defined, Wi-Fi is a wireless local area network (WLAN) technology based on the Institute of Electrical & Electronics Engineers (IEEE) 802.11 standards. WiMAX is a wireless metropolitan are network (MAN) technology based on the Institute of Electrical & Electronics Engineers (IEEE) 802.16 standards. 2G is second generation cellular network technology while 3G is third generation cellular network technology and 4G is fourth generation cellular network technology, of which LTE (Long Term Evolution) is an example. It should be noted that the present invention is not limited to a particular type of wireless service.

In FIG. 1, mobile device 112 may have been using the AP 102 for receiving wireless data access, and mobile device 110 may have been using AP 105 for receiving wireless data access. In one embodiment, mobile device 110 and 112 both have autonomous software agents installed on them to collect wireless access performance data. In particular, mobile device 110 may automatically send collected wireless access performance data to a wireless access data server 121 using flow 130 and mobile device 112 may automatically send collected wireless access performance data to wireless access data server 121 using flow 132. Automatically collected wireless access performance data include, but are not limited to, physical location information, security requirements, and wireless AP identifier (ID).

It should be noted that although the wireless access data server 121 is illustrated as being deployed in the Internet 103, the present invention is not so limited. In other words, in one embodiment, the wireless access data server 121 can be deployed in the wireless network.

In one embodiment, the user of mobile device 110 may also choose to manually enter wireless access related data that cannot be collected by the installed software agent. For example, manually entered wireless access performance data include, but are not limited to, a wireless access experience rating (e.g., a rating between 1-10, where "10" indicates a highest level of satisfaction with the wireless access experience and "1" indicates a lowest level of satisfaction with the wireless access experience, and so on) and wireless access cost data (e.g., cost/minute, cost/month, cost/log-on, free and so on).

In addition, wireless access data server 121 can also collect Internet connection service performance and physical layer service performance related data from AP 102 and 105 using flow 133 and 134 respectively, if available, from the service providers supporting the corresponding wireless access services through these access points. For example, the Internet connection service, or network layer, performance data may include, but are not limited to, Internet Protocol (IP) layer throughput, IP layer packet loss ratio, and IP layer packet level jitter data associated with an AP. The physical layer service performance data may include, but are not limited to, physical layer bandwidth and wireless signal to noise ratio data associated with an AP.

With the automatically collected performance data from mobile devices 110 and 112, manually input performance data from the user of mobile device 110, and/or automatically collected performance date from AP 102 and 105, as well as historical performance data collected from other mobile devices and users previously served by AP 102 and 105, wireless access data server 121 can then dynamically rank the wireless service performance for each AP in the common physical neighborhood 130 based on various service performance attributes including, but are not limited to, a bandwidth parameter, a connectivity parameter, a number of available connection parameter, etc. For example, wireless access data server 121 can rank wireless service performance based on any of these attributes. For instance, a ranking based on bandwidth can be created and another ranking based on the number of available connections can also be created, or any combination thereof.

It should be noted that in one alternate embodiment, additional data from professional rating or research services, e.g., J. D. Power of Westlake Village, Calif. and Consumer Reports of Yonkers, N.Y., can be employed as well to supplement the performance data as discussed above. In other words, these professional rating or research services may also provide evaluation data on the service performance related to the various APs.

In one embodiment, wireless access data server 121 performs service performance prediction for each AP and refines the created ranking based on historical wireless access performance and wireless user volume. For example, based on the time of day, day of week, or certain day of year historical data, service performance prediction can be made for one or more specific time periods. For example, for a particular location, a certain AP may tend to be congested, e.g., with a low IP layer throughput, between 8 pm to 11 pm during weekdays; therefore, its rank will be lowered during this specific time period. With this information, wireless access data server 121 can dynamically refine the rankings by incorporating this type of time specific historical information into the wireless performance data rankings.

Furthermore, wireless access data server 121 can further refine the AP recommendation rankings at the common physical neighborhood 130 based on historical Internet traffic pattern data from the network equipment (e.g. switches and routers in a service provider's network) and wireline traffic engineering guidelines affecting an AP, if these data or guidelines are available from a service provider. For example, if a service provider intends to divert wireless traffic from an area during a specific period of time that will adversely affect the performance of an AP, wireless access data server 121 can lower the ranking of the affected AP for the specific period of time.

Finally, wireless access data server 121 can generate a list of recommended APs (or a list of recommended wireless services) at the common physical neighborhood 130 based on the refined rankings. The information can be published at a corresponding social network website or actively pushed directly to the wireless handheld device via a corresponding social network website (e.g., through text messaging or pop-up window) whenever a new mobile device approaches or travels into the neighborhood.

For instance, when the mobile device 111 travels into the common physical neighborhood 130 and the user accesses one of the social network websites, the user can look up wireless access performance data from the wireless access data server 121 through its corresponding social network website using flow 131. Alternatively, wireless access data server 121 can push the pertinent wireless access performance recommendations of the common physical neighborhood 130 (using flow 131) via a corresponding social network website to the mobile device 111 when it travels into the neighborhood, e.g., via a message or a pop-up window. The user can therefore make an informed choice to select a wireless service from amongst a plurality of wireless services that best meets the user's wireless access needs. Broadly, selecting a wireless service encompasses selecting a particular type of wireless service (e.g., Wi-Fi, Wimax, cellular and the like), selecting a particular access point, and/or selecting a particular service provider associated with a particular wireless service, and so on.

Figure 2:
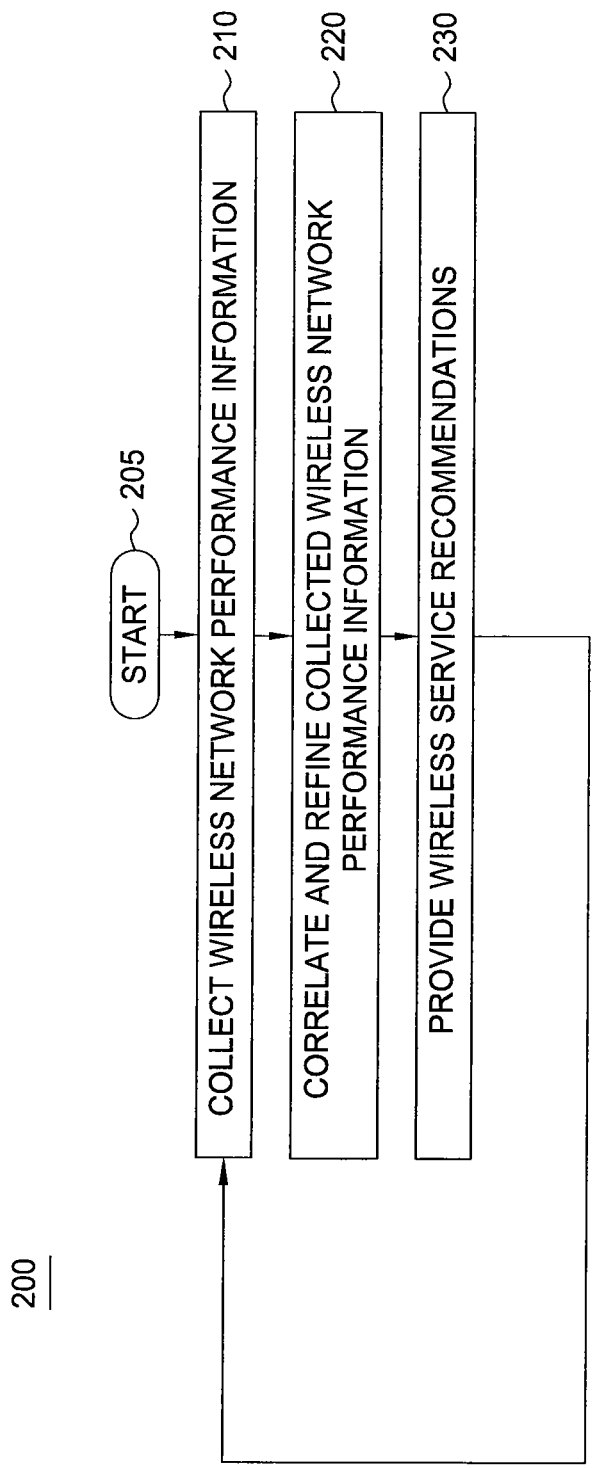
FIG. 2 illustrates a flowchart of a method for providing autonomous wireless access availability and performance logging using social networks of the present invention.

FIG. 2 illustrates a flowchart of a method 200 for providing autonomous wireless access performance logging using one or more social networks of the present invention. For example, one or more steps of method 200 can be executed by a wireless access data server. Method 200 starts in step 205 and proceeds to step 210.

In step 210, the method collects wireless access performance data from mobile devices with embedded automatic collection software agents, from users who manually enters their input, and/or from access points supporting the various wireless access services in a common physical neighborhood. In one embodiment, wireless access performance data automatically collected from the mobile devices with embedded software agents include, but are not limited to, physical location information, security requirement, and wireless AP identifier (ID). In one embodiment, wireless access performance data collected from manual inputs from the users include, but are not limited to, wireless access experience or ratings and/or wireless access cost data.

In one embodiment, wireless access performance data collected from wireless APs include IP layer and/or physical layer service performance data collected from those APs. For example, the Internet connection service, or network layer, performance data include, but are not limited to, Internet Protocol (IP) layer throughput, IP layer packet loss ratio, and IP layer packet level jitter data associated with those APs. For example, the physical layer service performance data include, but are not limited to, physical layer bandwidth and signal to noise ratio data associated with the AP.

In step 220, the method correlates the collected wireless access performance data to rank a plurality of available wireless access services. For example, with the collected access performance data from mobile devices, users, and/or APs, as well as performance data collected from other mobile devices and users previously served by an AP, a wireless access data server may rank all of the available wireless access services for a common physical neighborhood (broadly defined as a physical location) based on one or more service performance attributes including, but are not limited to, bandwidth, connectivity, number of available connections, etc.

In one embodiment, the wireless access data server may optionally perform service performance prediction for each AP and refines the ranking based on historical wireless access performance and wireless user volume for a particular time period. For example, based on time of day, day of week, or certain day of year historical data, service performance prediction can be made for these specific time periods. With the time specific performance information, the wireless access data server can then refine the rankings by incorporating the historical time specific performance trends into the rankings.

In one embodiment, the wireless access data server can further refine the AP recommendation ranking at a common physical neighborhood based on historical Internet traffic pattern data collected from network equipment (e.g. switches and routers in a service provider's network) and wireline traffic engineering guidelines affecting an AP, if these data or guidelines are available from a service provider.

In step 230, the method generates a list of recommended wireless services for a common physical neighborhood based on the rankings. In one embodiment, the information is published at a corresponding social network website, or actively pushed directly to the wireless handheld device via the corresponding social network website (e.g., through a text messaging or pop-up window) whenever a new mobile device approaches or travels into the neighborhood (broadly defined as the mobile device being proximate to the neighborhood). The method then proceeds back to step 210 to continuously update the wireless access performance data.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
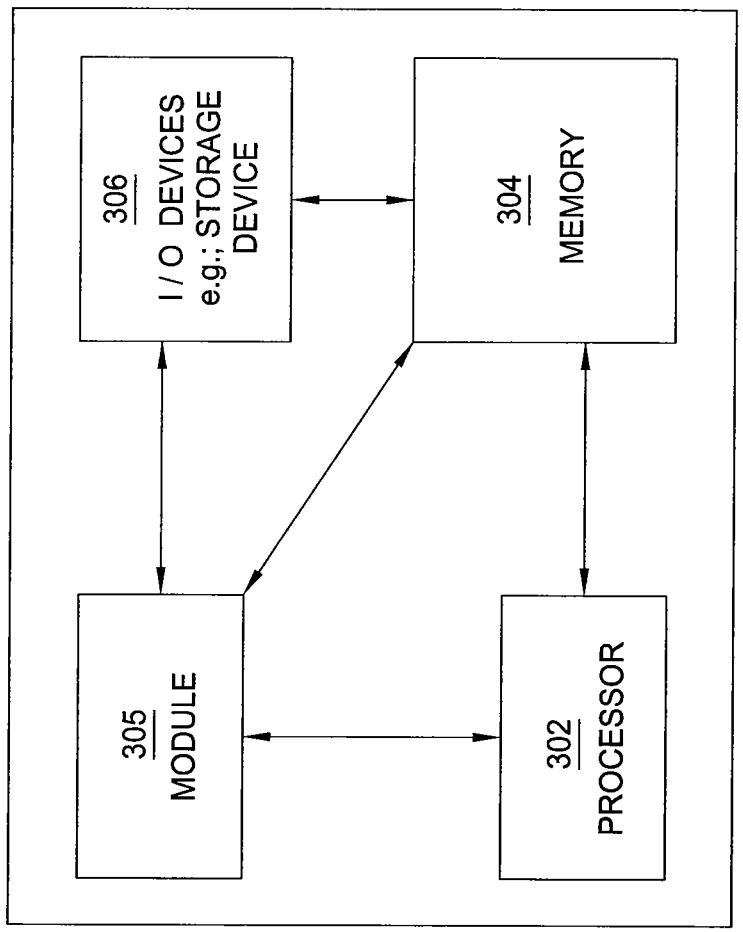
FIG. 3 illustrates a high-level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing autonomous wireless access performance logging, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for providing autonomous wireless access performance logging can be loaded into memory 304 and executed by processor 302 to implement the functions as discussed above. As such, the present process 305 for providing autonomous wireless access performance logging (including associated data structures) of the present invention can be stored on a computer readable medium, e.g., RAM memory, magnetic or optical drive or diskette and the like.

Figure 4:
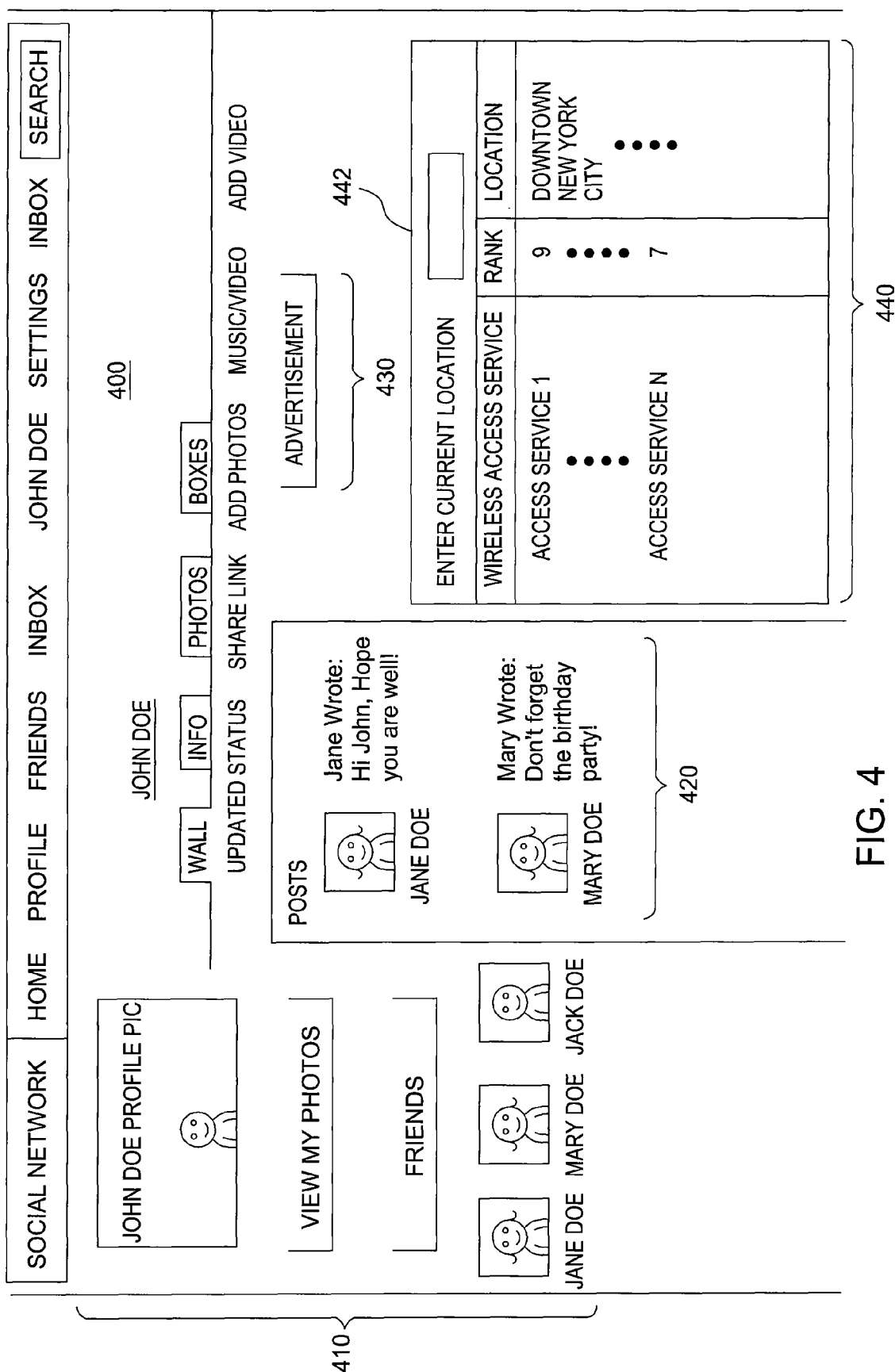
FIG. 4 illustrates an exemplary screen display of an illustrative social network website.

FIG. 4 illustrates an exemplary screen display of an illustrative social network website 400. The social network website 400 may comprise various sections, e.g., a user profile section 410 (e.g., pictures of the user, friends of the user, interests of the user and so on), a post section 420 (e.g., postings by friends of the users, or the user), and an advertisement section 430 (e.g., various advertisements from various sponsors). In one embodiment of the present invention, the social network website 400 may comprise a wireless access service ranking section 440. For example, the wireless access service ranking section 440 may list a plurality of available wireless access services that are available for a particular physical location. In one embodiment, the endpoint device used to access the social network website may automatically provide its current location so that the wireless access service ranking section 440 will only present a listing that is relevant to the current location of the endpoint device. Alternatively, the user may type-in a location in a query field or box 442 so that the wireless access service ranking section 440 will only provide a pertinent listing.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a ranking of a plurality of wireless access services, comprising:
    collecting, by a processor, wireless access performance data from a plurality of users who provide manual inputs;
    generating, by the processor, the ranking of the plurality of wireless access services that are available for a physical location based on the wireless access performance data;
    refining, by the processor, the ranking by incorporating a service performance prediction for a specific time of day, by using historical Internet traffic pattern data from network equipment and by using wireline traffic engineering guidelines; and
    providing, by the processor, the ranking of the plurality of wireless access services that have been refined and are available for the physical location via an on-line social network website that is accessible to a mobile device that is proximate to the physical location.

2. The method of claim 1, wherein the plurality of wireless access services includes a wireless fidelity service.

3. The method of claim 1, wherein the wireless access performance data collected from the plurality of users comprises a wireless access experience rating.

4. The method of claim 1, further comprising:
    correlating the wireless access performance data based on a service performance attribute comprising a bandwidth parameter.

5. The method of claim 1, wherein the providing comprises:
    publishing the ranking of the plurality of wireless access services on the social network website.

6. The method of claim 1, wherein the providing comprises:
    pushing the ranking of the plurality of wireless access services via the social network website to the wireless device.

7. The method of claim 6, wherein the pushing comprises:
    pushing the ranking of the plurality of wireless access services via the social network website to the wireless device via a text message.

8. The method of claim 6, wherein the pushing comprises:
pushing the ranking of the plurality of wireless access services via the social network website to the wireless device via a pop-up window.

9. The method of claim 1, wherein the plurality of wireless access services includes a WiMAX service.

10. The method of claim 1, wherein the plurality of wireless access services further includes a fourth generation wireless service.

11. The method of claim 1, wherein the wireless access performance data collected from the plurality of users comprises a wireless access cost data.

12. The method of claim 1, further comprising:
correlating the wireless access performance data based on a connectivity parameter.

13. The method of claim 1, further comprising:
correlating the wireless access performance data based on a number of available connections parameter.

14. The method of claim 1, wherein the plurality of wireless access services further includes a third generation wireless service.

15. A non-transitory computer-readable medium storing a plurality of instructions, which, when executed by a processor, cause the processor to perform operations for providing a ranking of a plurality of wireless access services, the operations comprising:
collecting wireless access performance data from a plurality of users who provide manual inputs;
generating the ranking of the plurality of wireless access services that are available for a physical location based on the wireless access performance data;
refining the ranking by incorporating a service performance prediction for a specific time of day, by using historical Internet traffic pattern data from network equipment and by using wireline traffic engineering guidelines; and
providing the ranking of the plurality of wireless access services that have been refined and are available for the physical location via an on-line social network website that is accessible to a mobile device that is proximate to the physical location.

16. The non-transitory computer-readable medium of claim 15, wherein the plurality of wireless access services includes a wireless fidelity service.

17. The non-transitory computer-readable medium of claim 15, wherein the wireless access performance data collected from the plurality of users comprises a wireless access experience rating.

18. The non-transitory computer-readable medium of claim 15, further comprising:
correlating the wireless access performance data based on a service performance attribute comprising a bandwidth parameter.

19. A system for a ranking of a plurality of wireless access services, comprising:
a processor; and
a computer-readable medium storing a plurality of instructions which, when executed by the processor, cause the processor to perform operations, the operations comprising:
collecting wireless access performance data from a plurality of users who provide manual inputs;
generating a ranking of a plurality of wireless access services that are available for a physical location based on the wireless access performance data;
refining the ranking by incorporating a service performance prediction for a specific time of day, by using historical Internet traffic pattern data from network equipment and by using wireline traffic engineering guidelines; and
providing the ranking of the plurality of wireless access services that have been refined and are available for the physical location via an on-line social network website that is accessible to a mobile device that is proximate to the physical location.

* * * * *